United States Patent
Nguyen

(10) Patent No.: US 9,701,888 B2
(45) Date of Patent: *Jul. 11, 2017

(54) MICROEMULSION FLOWBACK AID COMPOSITION AND METHOD OF USING SAME

(75) Inventor: Duy T. Nguyen, Houston, TX (US)

(73) Assignee: Ecolab USA Inc., St. Paul, MN (US)

(*) Notice: Subject to any disclaimer, the term of this patent is extended or adjusted under 35 U.S.C. 154(b) by 547 days.

This patent is subject to a terminal disclaimer.

(21) Appl. No.: 13/431,003

(22) Filed: Mar. 27, 2012

(65) Prior Publication Data

US 2013/0261033 A1 Oct. 3, 2013

(51) Int. Cl.
| | | |
|---|---|---|
| C09K 8/584 | (2006.01) | |
| C09K 8/68 | (2006.01) | |
| C09K 8/60 | (2006.01) | |
| C10G 33/04 | (2006.01) | |

(52) U.S. Cl.
CPC .............. *C09K 8/584* (2013.01); *C09K 8/602* (2013.01)

(58) Field of Classification Search
CPC ........................... C09K 8/584; Y10S 507/938
USPC ................................ 507/240, 246, 254, 938
See application file for complete search history.

(56) References Cited

U.S. PATENT DOCUMENTS

| | | | |
|---|---|---|---|
| 4,029,570 A | | 6/1977 | Coffman et al. |
| 4,089,803 A | * | 5/1978 | Bessler .................... 516/164 |
| 5,035,876 A | | 7/1991 | Castellano |
| 5,759,409 A | * | 6/1998 | Knauf ..................... C10G 33/04 |
| | | | 208/188 |
| 5,854,187 A | | 12/1998 | Blum et al. |
| 6,147,047 A | | 11/2000 | Robbins et al. |
| 6,294,093 B1 | | 9/2001 | Selvarajan et al. |
| 7,380,606 B2 | | 6/2008 | Pursley et al. |
| 7,566,744 B2 | | 7/2009 | Newman et al. |
| 7,615,516 B2 | | 11/2009 | Yang et al. |
| 7,655,603 B2 | | 2/2010 | Crews et al. |
| 7,886,824 B2 | | 2/2011 | Kakadjian et al. |
| 7,893,010 B2 | | 2/2011 | Ali et al. |
| 7,960,314 B2 | | 6/2011 | Van Zanten et al. |
| 7,989,404 B2 | | 8/2011 | Kakadjian et al. |
| 7,998,911 B1 | | 8/2011 | Berger et al. |
| 8,091,646 B2 | | 1/2012 | Quintero et al. |
| 2003/0032683 A1 | | 2/2003 | Spalding |
| 2003/0166472 A1 | | 9/2003 | Pursley et al. |
| 2006/0258541 A1 | | 11/2006 | Crews et al. |
| 2007/0272277 A1 | * | 11/2007 | Jeffreys ..................... C11D 1/30 |
| | | | 134/25.2 |
| 2008/0287324 A1 | | 11/2008 | Pursley et al. |
| 2009/0149557 A1 | | 6/2009 | Talingting-Pabalan et al. |
| 2009/0200027 A1 | * | 8/2009 | Kakadjian et al. ......... 166/270.1 |
| 2009/0281004 A1 | | 11/2009 | Ali et al. |
| 2011/0021386 A1 | | 1/2011 | Ali et al. |
| 2011/0021388 A1 | | 1/2011 | Van Zanten et al. |
| 2011/0218126 A1 | | 9/2011 | Berger et al. |
| 2011/0220353 A1 | | 9/2011 | Bittner et al. |
| 2011/0247965 A1 | | 10/2011 | Nguyen et al. |

FOREIGN PATENT DOCUMENTS

| | | |
|---|---|---|
| EP | 1639989 A1 | 3/2006 |
| KR | 20100107486 A1 | 10/2010 |
| WO | WO 99/58631 A1 | 11/1999 |
| WO | 2009006251 A1 | 1/2009 |

OTHER PUBLICATIONS

International Search Report mailed Jun. 28, 2013 for related PCT application PCT/US2013/033994. (12 Pages).
The International Search Report dated Jul. 26, 2013 in connection with International Application No. PCT/US2013/037361.
The extended European Search Report dated Oct. 12, 2015 in connection with European Patent Application No. 13767501.1.
Patent Examination Report No. 1 dated Oct. 15, 2015 in connection with Australian Patent Application No. 2013239828.
The extended European Search Report dated Nov. 16, 2015 in connection with European Patent Application No. 13778640.6.

* cited by examiner

*Primary Examiner* — Aiqun Li
(74) *Attorney, Agent, or Firm* — Kagan Binder, PLLC

(57) ABSTRACT

Disclosed and claimed is a microemulsion flowback aid composition and a method of enhancing recovery of oil or gas during fracturing or stimulation processes. The microemulsion flowback aid composition includes (i) an oil-like phase comprising at least one nonionic surfactant having a hydrophilic-lipophilic balance (HLB) of less than about 9; (ii) a coupling agent capable of stabilizing the microemulsion flowback aid composition; (iii) at least one water-soluble or dispersible nonionic surfactant that is different from the at least one nonionic surfactant in the oil-like phase; (iv) at least one additional surfactant selected from anionic, cationic, amphoteric, and combinations thereof; and (v) water.

15 Claims, No Drawings

US 9,701,888 B2

MICROEMULSION FLOWBACK AID COMPOSITION AND METHOD OF USING SAME

TECHNICAL FIELD

This invention relates generally to novel flowback aid compositions that are effective in aiding flowback of stimulation fluid from an oil or gas well. More specifically, the invention relates to such flowback aid compositions that enhance relative oil and gas permeability when applied with stimulation fluids to oil or gas wells. The invention has particular relevance to microemulsion flowback compositions comprising the disclosed surfactants and a stabilizing coupling agent.

BACKGROUND OF THE INVENTION

Literature data shows from 60 to 90% of the injected fluids used in fracturing operations stay in tight gas reservoirs. These large amounts of water are believed to be trapped in the area surrounding the fracture and within the fracture. The trapped fluid lowers the relative permeability and effective flow area thereby decreasing well productivity. Many flow back aids have been developed and discussed in the prior art to help recover injected fluids after fracturing. The flow back aids reduce damage due to phase trapping, improve mobilization of the oil and gas, increase the regained permeability and enhance oil/gas production. Flow back aid formulations in the prior art contain solvents (e,g., oils such as hydrocarbons, terpenes, esters), surfactants, and co-surfactant(s)) that are in the solution or microemulsion form (see e.g., U.S. Pat. Nos. 8,091,646; 7,998,911; 7,989,404; 7,960,314; 7,893,010; and 7,380,606 and U.S. Patent Publication Nos. 2011/0021386; 2009/0281004; and 2008/0287324). A disadvantage of traditional flowback aids is the inclusion of a convention oil or solvent. There thus exists an industrial need for novel flow back aid compositions comprising an oil-in-water type of microemulsion without the requirement that a conventional oil or solvent be present.

SUMMARY OF THE INVENTION

This invention accordingly provides a novel microemulsion flowback aid composition effective in aiding flowback of stimulation fluid from an oil or gas well and enhancing relative oil and gas permeability when applied with stimulation fluids to the oil or gas well. In an aspect, the microemulsion flowback aid composition includes (i) an oil-like phase comprising at least one nonionic surfactant having a hydrophilic-lipophilic balance (HLB) of less than about 9; (ii) coupling agent capable of stabilizing the microemulsion flowback aid composition; (iii) at least one water-soluble or dispersible nonionic surfactant that is different from the at least one nonionic surfactarit in the oil-like phase; (iv) at least one additional surfactant selected from anionic, cationic, amphoteric, and combinations thereof; and (v) water.

In another aspect, the invention is a method of enhancing recovery of oil or gas during fracturing or stimulation processes. The method includes (i) adding the disclosed microemulsion flowback aid composition into a subterranean formation via water or injection brine, (ii) reducing surface or interfacial tension and/or increasing contact angle, and thereby (iii) allowing enhanced fluid recovery during the fracturing or stimulation processes. In an embodiment, the method further includes forming a single phase microemulsion in situ in the subterranean reservoir, where the in situ-formed single phase microemulsion is a thermodynamically stable, macroscopically homogeneous mixture of at least the following components: (i) an oil-like phase comprising at least one nonionic surfactant having a hydrophilic lipophilic balance (HLB) of less than about 9; (ii) a coupling agent capable of stabilizing the microemulsion fib whack aid composition; (iii) at least one water-soluble or dispersible nonionic surfactant that is different from the at least one nonionic surfactant in the oil-like phase; (iv) at least one additional surfactant selected from anionic, cationic, amphoteric, and combinations thereof; (v) water; and a nonpolar material derived from the subterranean formation.

In another aspect, the invention is a process for increasing flowback from a subterranean reservoir formation. The process includes adding the disclosed microemulsion flowback aid composition to a fracturing formulation at concentrations from about 0.1 to about 5 gallons per thousand gallons, based on volume of injected fluid. In an embodiment, the process farther includes forming a single phase microemulsion in situ in the subterranean reservoir, where the in situ-formed single phase microemulsion is a thermodynamically stable, macroscopically homogeneous mixture of at least the following components: (i) an oil-like phase comprising at least one nonionic surfactant having a hydrophilic-lipophilic balance (HLB) of less than about 9; (ii) a coupling agent capable of stabilizing the microemulsion flowback aid composition; (iii) at least one water-soluble or dispersible nonionic surfactant that is different from the at least one nonionic surfactant in the oil-like phase; (iv) at least one additional surfactant selected from anionic, cationic, amphoteric, and combinations thereof; (v) water; and a nonpolar material derived from the subterranean formation.

It is an advantage of the invention to provide enhanced fluid recovery and relative permeability enhancement of fractured subterranean formations.

It is another advantage of the invention to provide novel flowback aids that improve oil and gas production.

It is a further advantage of the invention to remove unwanted deposits from wellbore and production equipment.

It is yet another advantage of the invention to provide novel flowback aids that are effective without the use of solvents (e.g., hydrocarbons, terpenes, and the like).

An added advantage of the invention includes wettability alteration, well cleanout, and reduced well damage due to phase trapping.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims

DETAILED DESCRIPTION OF THE INVENTION

This invention fills an industrial need for improved flowback aids for use in oil and gas wells that have been subjected to the application of stimulation fluids. An aspect of the present invention is its usefulness for enhancing oil and gas recovery from subterranean reservoir formations by forming microemulsions, in another aspect, the invention has usefulness to remove various nonpolar materials, such as oil-based mud, synthetic-based mud, paraffins, asphaltenes, slugs, emulsions, and combinations thereof, from subterranean formations. Such removal may act to heal, restore, or remediate the formations. The microemulsions of the present invention are typically single phase microemulsions but may also be multiphase according to alternative embodiments. In embodiments, the microemulsions are formed prior to pumping to the subterranean reservoir, or the microermilsions may be formed in situ in the subterranean reservoir or an injected microemulsion could form a new microemulsion incorporating non-polar and polar fluids and particles already present in the formation. An in situ microemulsion may be formed when a surfactant (or a plurality of surfactants) and a polar phase (e.g., water or brine) contacts the reservoir formation and solubilizes the nonpolar material encountered in the pores of the formation.

The invention in a preferred embodiment is a microemulsion flowback aid composition effective in aiding flowback of stimulation fluid from an oil or gas well and enhancing relative oil and gas permeability when applied with stimulation fluids to the oil or gas well. In an embodiment, the disclosed microemulsion flowback aid composition includes: (i) an oil-like phase comprising, (ii) at least one coupling agent, (iii) at least one water-soluble or dispersible nonionic surfactant that is different from the at least one nonionic surfactant in the oil-like phase, (iv) at least one additional surfactant, and (v) water.

In an embodiment, the oil-like phase includes at least one nonionic surfactant having a hydrophilic-lipophilic balance (HLB) of less than about 9. In embodiments, the nonionic surfactant having an HLB of less than about 9 is selected from at least one of the following: linear and branched alkoxylated alcohols, alkoxylated alkylphenols, glycerol esters, glycol esters, polyetheyleneglycol esters, polyglycerol esters, sorbitol esters, ethylene oxide/propylene oxide copolymers, and combinations thereof. In embodiments with an alkoxylated alcohol, they may be selected from at least one of the following: ethoxylated and propoxylated $C_6$-$C_{20}$ alcohols; and mixtures thereof. The ethoxylated and propoxylated $C_6$-$C_{20}$ alcohols preferably have about 1-6 moles of ethylene oxide, or about 1-6 moles of propylene oxide, or 1-6 and 1-6 moles of ethylene oxide and propylene oxide, respectively, per mole of alcohol. The amount of the nonionic surfactant comprising the oil-like phase is preferably in the range of about 0.1% to about 35%, and more preferably, about 2% to 25%, by weight based on the total weight of the microemulsion flowback aid composition.

In an embodiment, the alkoxylated alcohol in the microemulsion flowback aid composition comprises about 1-6 moles of alkylene oxide per mole of alcohol.

In an embodiment, from about 0.1% to about 35% of the at least one nonionic surfactant of component (i) is present in the oil-like phase of the microemulsion flowback aid composition, based on weight.

In an embodiment, from about 2% to about 25% of the at least one nonionic surfactant of component (i) is present in the oil-like phase of the microemulsion flowback aid composition, wherein, based on weight.

In an embodiment, from about 2% to about 30% of the at least one nonionic surfactant of component (i) is present in the oil-like phase of the microemulsion flowback aid composition, based on weight.

In an embodiment, the coupling agent is capable of stabilizing the microemulsion flowback aid composition. In embodiments, the coupling agent is a water-soluble organic solvent. Representative water-soluble organic solvents include, for example, at least one of the following: short chain alcohols with between 1 and 6 carbon atoms; diols with between 1, and 6 carbon atoms; glycerol; alkyl ethers of alkylene glycols with between 1 and 6 carbon atoms; polyalkylene glycols less than 6 kD; and mixtures thereof. Representative short chain alcohols include, for example, at least one of the following: methanol, ethanol, n-propanol, and combinations thereof. Representative diols include, for example, at least one of the following: methylene glycol, ethylene glycol, propylene glycol, and combinations thereof. Representative alkyl ethers of alkylene glycols include, for example, ethylene glycol mono-n-butyl ether.

In an embodiment, from about 5% to about 40% of the coupling agent of component (ii) is present in the microemulsion flowback aid composition, based on the total weight of the composition.

In an embodiment, the microemulsion flowback aid composition includes at least one water-soluble or dispersible nonionic surfactant that is different from the at least one nonionic surfactant in the oil-like phase, in an embodiment, the water-soluble or dispersible nonionic surfactant includes, for example, an alkoxylated alcohol, ethylene oxide/propylene oxide copolymers, and/or alkoxylated alkylphenol having an HLB greater than about 10.

In an embodiment, from about 2 to about 20% of the anionic, cationic, amphoteric surfactant is present in the microemulsion flowback aid composition, based on total weight.

In an embodiment, the additional surfactant is selected from anionic surfactants, cationic surfactants, amphoteric surfactants, and combinations thereof. Representative additional surfactants include, for example, at least one of the following: linear alkylbenzene sulfonic acid, alkyl benzene sulfonate, alkane sulfonate, alkyl sulfate, alkyl ether sulfate, alkyl ammonium halides, alkyl aryl ammonium halides, imidazolium, cocoamidopropyl betaine, cocodimethyl betaine, alkyl amine oxide, and combinations thereof exclusive of combinations with both anionic and cationic surfactants.

Flowback aids can form stable emulsions when in contact with residual oil. The formation of emulsions is a serious problem during well stimulation processes and can cause a significant reduction of production, large loss of oil, and even compromise viable economic exploitation. These losses can amount to about 55%. To combat such emulsions, the present microemulsion flowback aid composition may further include at least one nonionic demulsifier. Representative nonionic demulsifiers include, for example, at least one of the following: polyethylenimine alkoxylates, alkoxylated alkylphenol formaldehyde resins, alkoxylated amine-modified alkylphenol formaldehyde resins, ethylene oxide/propylene oxide copolymers, cross-linked ethylene oxide/propylene oxide copolymers, alkoxylated sorbitan esters, and mixtures thereof. In an embodiment, up to about 20% of the nonionic demulsifier is present in the microemulsion flowback aid composition., based on total weight. In another embodiment, up to about 25% of the water-soluble or dispersible nonionic surfactant is present in the microemulsion flowback aid composition, based on total weight. These microemulsion-based demulsifers can also be used at the well head or be injected downhole to break the emulsion. Since the microemulsion contains very tiny droplets which encapsulate the demulsifier, it then can migrate more quickly to the oil and water interface than the non-microemulsion demulsifier. As a result, the demnisification efficiency is increased.

The disclosed microemulsion flowback aid composition may further include additional components or adjuncts, such as at least one of oxidizing agents, water-soluble enzymes, precursors to these components, and combinations thereof.

The present invention also provides a method of enhancing recovery of oil or gas during fracturing or stimulation processes. The method includes (I) adding at least variation of the disclosed microemulsion flowback aid composition into a subterranean formation via water or injection brine, (ii) reducing surface or interfacial tension and/or increasing contact angle, and thereby (iii) allowing enhanced fluid recovery during the fracturing or stimulation processes.

In an embodiment, the method of the invention further includes forming a single phase microemulsion in situ in the subterranean reservoir, where the in situ-formed single phase microemulsion is a thermodynamically stable, macroscopically homogeneous mixture of at least the following components (as described in more detail herein): (i) an oil-like phase comprising at least one nonionic surfactant having a hydrophilic-lipophilic balance (HLB) of less than about 9; (ii) a coupling agent capable of stabilizing the microemulsion flowback aid composition; (iii) at least one water-soluble or dispersible nonionic surfactant that is different from the at least one nonionic surfactant in the oil-like phase; (iv) at least one additional surfactant selected from anionic, cationic, amphoteric, and combinations thereof; (v) water; and a nonpolar material derived from the subterranean formation.

This invention also provides a process for increasing flowback from subterranean reservoir formation, the process comprising adding the disclosed microemulsion flowback aid composition to a fracturing formulation at concentrations from about 0.1 to about 5 gallons per thousand gallons, based on volume of injected fluid. In an embodiment, the process further includes forming a single phase microemulsion in situ in the subterranean reservoir, where the in situ-formed single phase microemulsion is a thermodynamically stable, macroscopically homogeneous mixture of at least the following components (as described in detail herein): (i) an oil-like phase comprising at least one nonionic surfactant having a hydrophilic-lipophilic balance (ELS) of less than about 9; (ii) coupling agent capable of stabilizing the microemulsion flowback aid composition; (iii) at least one water-soluble or dispersible nonionic surfactant that is different from the at least one nonionic surfactant in the oil-like phase; (i) at least one additional surfactant selected from anionic, cationic, amphoteric, and combinations thereof; (v) water; and a nonpolar material derived from the subterranean formation, In an embodiment, the in situ emulsion-forming components further comprise a fluid selected from the group consisting of a non-polar fluid and a fluid of intermediate polarity. The nonpolar material includes, for example, at least one of oil-based mud, synthetic-based mud, paraffins, aromatic hydrocarbons, asphaitenes, emulsions, slugs, and combinations thereof.

The flow back aid of the present invention may also be applied in slick water fracturing. Several additional chemicals such as friction reducers, scale inhibitors, clay swelling inhibitors, biocides, flow back aids, and surfactants may be added on the fly during treatment with the composition of the present invention.

The foregoing may be better understood by reference to the following examples, which are intended for illustrative purposes and are not intended to limit the scope of the invention or its application in any way.

EXAMPLE 1

Preparation of the Flow-Back Aids

This example provides representative formulations for the flowback aids of the invention.

Sample 73-2: 24% alcohol ethoxylate (C12+3 EO), 12% cocoamidopropyl betaine, 8% IPA, 56% water Sample 67-1: 6.4% alcohol ethoxylate (C12+3 EO), 5.4% , alcohol ethoxylate (C12+6 EO) 2.9% decylamine oxide, 4.9% IPA, 2.5% DPNB (dipropylene glycol n-butyl ether), 77.9% water Sample 70-3: 30% alcohol ethoxylate (C12+3 EO), 15% decylamine oxide, 10% IPA, 45% water Sample 121-3: 24% alcohol ethoxylate (C12+3 EO), 3% alcohol ethoxylate (C12+6 EO) 3% alcohol alkoxylate sulfate , 62% water Sample 123-2: 20% alcohol ethoxylate (C12+3 EO), 10% alcohol alkoxylate sulfate, 15% IPA, 55% water Sample 110-2: 3% alcohol ethoxylate (C12+3 EO), 5.2% EO/PO copolymer (water dispersible), 2.7% ethoxylated C8 alcohol, 2.7% EO/PO copolymer (water soluble), 0.1% linear alkylbenzene sulfonic acid, 7% alkoxylated poiyethyleneimine, 1.3% polyethylene glycol, 40% propylene glycol, 38% water Sample 125-1: 15% alcohol ethoxylate (C12+3EO), 11% EO/PO copolymer, 6% alcohol alkoxylate sulfate, 10% IPA, 58% water

EXAMPLE 2

Effect of the Flow-Back Aids on Solubilizing Light Oil

This test was performed to compare the ability of various fiowback aids to solubilize light oil (i.e., condensate obtained from a refinery). Solubilizing the oil will, in turn, significantly reduce the interfacial tension thereby removing oil trapped in the reservoir rock and enhancing oil or gas production. Table 1 shows the results using the samples from Example 1 along with the samples from prior art. Clear solution after mixing the condensate with the sample is indicative of ultra-low interfacial tension between the condensate and the sample, resulting in a low capillary pressure. The results clearly demonstrate that the present invention (clear solution after mixing with light oil) is superior to those currently employed today, for example Product A (turbid with phase separation after mixing with light oil). Product A is non-microemulsion commercial product which contains water-soluble nonionic surfactants, water, and IPA.

TABLE 1

Effectiveness of Flowback Aids on Solubilizing Condensate

| Sample | Amount of condensate solubilized in 10 g of sample, g | Appearance after mixing |
| --- | --- | --- |
| #73-2 | 5 | Clear |
| #121-3 | 6 | Clear |
| #70-3 | 6 | Clear |
| #123-2 | 7 | Clear |
| Product A | 1 | Turbid with phase separation |

TABLE 1-continued

Effectiveness of Flowback Aids on Solubilizing Condensate

| Sample | Amount of condensate solubilized in 10 g of sample, g | Appearance after mixing |
|---|---|---|
| 3% alcohol ethoxylate (C12 + 6 EO), 3% alcohol alkoxylate sulfate, 8% IPA, 86% water | 1 | Turbid with phase separation |

Advancing contact angle of water on the glass coated with the flowback aid after which it was dried in an 80° C. oven was also measured. Contact angle is important as wettability is an important factor for effective oil recovery. The wettability of subterranean formation varies from water-wet to oil-wet. When the formation has no affinity for water or oil, the wettability is intermediate. In this invention, intermediate wettability is achieved when the advancing water contact angle is between 62 and 133 degrees (Morrow, J. Can. Pet. Technol. 15 (4), pgs. 49-69, 1972). As indicated by contact angle values shown in Table 2, the present invention produced intermediate wetting which in turn lowered the capillary pressure significantly.

TABLE 2

Water Advancing Contact Angle

| Sample | Water Advancing Contact Angle, Degrees |
|---|---|
| Untreated | 11.0 |
| #67-1 | 68.2 |
| #73-2 | 70.2 |

EXAMPLE 3

Emulsion Prevention Test

This test was performed to compare the ability of various flowback aids to prevent emulsion formation when contacted with residual oil. Various flowback aids were added to 25 ml of 4% KCl with pH adjust to 11. Twenty five (25) ml of 4% KCl containing the flowback aid was mixed with twenty five (25) ml of oil obtained from West Texas and blended at 14,000 rpm in a Waring Blender for 1 minute to emulsify the two liquids. The emulsion was then poured into a 6-oz glass prescription bottle (an industry standard for this test) to observe the water breakout from the emulsion, water quality, interface quality, and wettability. Table 3 shows the results using commercially available samples along with the results using the sample 110-2 from Example 1. The results show the present invention (sample 110-2) is superior to currently available commercial samples (Products A and B) with regard to quicker water drop out, sharp interface, clean water, and excellent wettability. Product B is a non-microemulsion commercial product which contains methanol, water, water-soluble nonionic surfactants, and ethoxylated alkylphenol formaldehyde resins.

TABLE 3

Emulsion Prevention Test
% Breakout

| Sample | Dosage gallon per 1000 gallons of brine | 30 sec | 72 hrs | Interface | Water quality | Wettability |
|---|---|---|---|---|---|---|
| Untreated | 0 | 0 | 10 | Ragged | Dirty | Poor (oil adhered to glass) |
| 110-2 | 1 | 100 | 100 | Clean/sharp | Clear | Excellent |
| Product A | 1 | 80 | 100 | Clean | Hazy | Poor (oil adhered to glass) |
| Product B | 2 | 100 | 100 | Clean | Clean | Poor |

EXAMPLE 4

Core Flood Studies

Core flood studies were conducted with residual oil saturation using Product A and Sample 125-1 at 2 gpt (gallon per thousand) in 2% KCl with quarried Ohio sandstone core plugs. Results of these studies showed that an embodiment of the present invention (Sample 125-1) improved the effective gas permeability much better than the prior art (Product A) especially at low gas flow rates (Table 4).

TABLE 4

Percent Change in Effective Gas Permeability

| Treatment | Product A | Sample 125-1 |
|---|---|---|
| Gas 40 psi | +26.7 | +204.2 |
| Gas at 120 psi | +16.7 | +21.1 |
| Gas at 200 psi | +5.1 | +21.9 |
| Gas at 700 psi | +0.9 | +0.3 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A microemulsion flowback aid composition consisting of:(i) a first nonionic surfactant having a hydrophilic-lipophilic balance (HLB) of less than about 9 and selected from linear and branched alkoxylated alcohols, alkoxylated alkylphenols, glycerol esters, glycol esters, polyetheyleneglycol esters, polyglycerol esters, sorbitol esters, ethylene oxide/propylene oxide copolymers, or combinations thereof; (ii) a water-soluble organic solvent; (iii) a second nonionic surfactant that is water-soluble or dispersible and is different from the first nonionic surfactant; (iv) a cationic surfactant, an amphoteric surfactant, or a combination thereof; (v) a nonionic demulsifier selected from a cross-linked ethylene oxide/propylene oxide copolymer or a mixture of a cross-linked ethylene oxide/propylene oxide copolymer and a polyethyleneimine alkoxylate; and (vi) water.

2. The microemulsion flowback aid composition of claim 1, wherein the amphoteric surfactant is selected from cocoamidopropyl betaine, cocodimethyl betaine, alkyl amine oxide, or a combination thereof.

3. The microemulsion flowback aid composition of claim 1, wherein the alkoxylated alcohols are selected from ethoxylated $C_6$-$C_{20}$ alcohols, propoxylated $C_6$-$C_{20}$ alcohols, or a combination thereof.

4. The microemulsion flowback aid composition of claim 3, wherein the alkoxylated alcohols comprise about 1-6 moles of alkylene oxide per mole of alcohol.

5. The microemulsion flowback aid composition of claim 1, wherein the composition comprises from about 0.1% to about 35% by weight of the first nonionic surfactant.

6. The microemulsion flowback aid composition of claim 1, wherein the water-soluble organic solvent is selected from short chain alcohols with between 1 and 6 carbon atoms, diols with between 1 and 6 carbon atoms, glycerol, alkyl ethers of alkylene glycols with between 1 and 6 carbon atoms, polyalkylene glycols less than 6 kD, or any combination thereof.

7. The microemulsion flowback aid composition of claim 6, wherein the short chain alcohol is selected from methanol, ethanol, n-propanol, or any combination thereof.

8. The microemulsion flowback aid composition of claim 6, wherein the diol is selected from methylene glycol, ethylene glycol, propylene glycol, or any combination thereof.

9. The microemulsion flowback aid composition of claim 6, wherein the alkyl ethers of alkylene glycols comprises ethylene glycol mono-n-butyl ether.

10. The microemulsion flowback aid composition of claim 1, wherein the composition comprises from about 5% to about 40% by weight of the water-soluble organic solvent.

11. The microemulsion flowback aid composition of claim 1, wherein the second nonionic surfactant is selected from an alkoxylated alcohol, ethylene oxide/propylene oxide copolymers, an alkoxylated alkylphenol having an HLB greater than about 10, or any combination thereof.

12. The microemulsion flowback aid composition of claim 1, wherein the cationic surfactant is selected from alkyl ammonium halides, alkyl aryl ammonium halides, imidazolium, or any combination thereof.

13. The microemulsion flowback aid composition of claim 1, wherein the composition comprises up to about 20% by weight of the nonionic demulsifier.

14. The microemulsion flowback aid compositon of claim 1, wherein the composition comprises up to about 25% by weight of the second nonionic surfactant.

15. The microemulsion flowback aid composition of claim 1, wherein the composition comprises from about 2% to about 20% by weight of the cationic surfactant, the amphoteric surfactant, or the combination thereof.

* * * * *